United States Patent

[11] 3,626,029

| [72] | Inventor | David W. Young |
| | | Homewood, Ill. |
| [21] | Appl. No. | 724,607 |
| [22] | Filed | Apr. 26, 1968 |
| [45] | Patented | Dec. 7, 1971 |
| [73] | Assignee | Atlantic Richfield Company |
| | | New York, N.Y. |

[54] POLYMER COMPOSITION OF SUPPRESSED ELECTROSTATIC CHARGES
5 Claims, No Drawings

[52] U.S. Cl. .................................................. 260/889,
260/45.95, 260/33.4, 260/889
[51] Int. Cl. ........................................................ C08f 45/58
[50] Field of Search .......................................... 260/889,
33.4, 33.4 PO, 94.7

[56] References Cited
UNITED STATES PATENTS

| 2,692,892 | 10/1954 | Hillyer et al. ................ | 260/94.7 |
| 2,879,244 | 3/1959 | Coler ............................ | 260/33.4 |
| 3,223,664 | 12/1965 | Conlon ......................... | 260/33.4 |
| 3,440,187 | 4/1969 | Young et al. ................. | 260/33.4 |

FOREIGN PATENTS

| 1,282,760 | 12/1962 | France ......................... | 260/94.7 |

*Primary Examiner*—Murray Tillman
*Assistant Examiner*—M. J. Tully
*Attorneys*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland ABSTRACT: A solid polymer composition of an ethylenically-unsaturated, aliphatic hydrocarbon wherein electrostatic charges are suppressed which comprises a polymer of an ethylenically-unsaturated, aliphatic hydrocarbon and a minor amount, sufficient to suppress the accumulation of electrostatic charges, e.g. about 0.05 to 5 wt. percent, based on the solid polymer, of a polyhydroxy polymer of a 1,3-diene of four to about 12 carbon atoms. The polyhydroxy polymer has an average of at least about 1.8 predominently primary, terminal allylic hydroxyl groups per molecule, a viscosity at 30° C. of about 5 to 20,000 poises and a number average molecular weight of about 400 to 25,000.

POLYMER COMPOSITION OF SUPPRESSED ELECTROSTATIC CHARGES

This invention relates to an improved method for suppressing the accumulation of electrostatic charges on synthetic resins. More particularly, this invention relates to an improved method for suppressing the accumulation of electrostatic charges on a polymer of an ethylenically unsaturated aliphatic hydrocarbon such as polyethylene, polyisobutylene, polyisoprene etc.

It is well known that articles manufactured from synthetic resins have a tendency to accumulate electrostatic charge especially under friction conditions. Certain synthetic resins manifest this tendency to a degree much greater than others. The problem of static electricity in synthetic resins is very serious and much effort has been devoted to eliminating or reducing the magnitude of accumulated electrostatic charges. The problem is manifested in contamination and dust accumulation on articles made from the synthetic resin and in annoying shocks and sometimes dangerous sparks from articles formed from the synthetic resins. These difficulties arise not only in the service life of the formed synthetic resin compositions, such as sheets, case and molded articles, but also during the manufacture of such articles which can result in a slow down in production, waste and hazards of explosions.

Articles comprising synthetic resins tend to accumulate electrostatic charges during manufacture, treatment and use. These accumulated electrostatic charges are troublesome in that not only do they render the articles more difficult to handle during manufacture and treatment, but also in that they greatly increase the tendency of the finished articles to accumulate unwelcome dust in use.

Many methods have been proposed to suppress the accumulation of static charges, none of which is entirely satisfactory. External methods such as temperature and humidity control, and dipping into aqueous surface-active agent solutions have been employed in production operations, but antistatic protection thereby is temporary and exists only when the synthetic resins are exposed to such condition.

A great number of agents have also been proposed for treating the surface of synthetic resins to prevent the generation of accumulation of electrostatic charges. However, such treatments are generally temporary in nature since these agents are removed by washing, leaching, or abrasion. All surface treatment methods, however, require additional handling of the articles formed from the synthetic resins during such treatment. This is generally undesirable from a production handling viewpoint and undesirable to the ultimate user if repeated applications are necessary. While such surface treatment is effective, static protection of the articles is removed with washing or contact with water because of the high water solubility of the surface active agents.

It is also known that antistatic agents can be compounded into the synthetic resins. Such incorporation of the antistatic agent into the synthetic resin is generally superior to any surface treatment or coating because of the permanency achieved. An antistatic agent for internal use in synthetic resins, as opposed to an external coating, must fulfill certain special requirements beginning with sufficient activity to give adequate antistatic effect at practical concentration levels. The agent must also be of a nature such that it can be quickly and uniformly incorporated into the synthetic resin during the compounding step, and, desirably, it should not impart color to the substrate. The antistatic agent also should not sweat out or extrude to the surface of the synthetic resin. Various antistatic agents have been proposed for use. However, antistatic agents which are effective when applied by normal coating methods, are not satisfactory for internal use, since during processing under necessarily high temperatures, they decompose and may cause or catalyze decomposition of the synthetic resin, resulting in undesirable darkening, or even complete discolorization of the synthetic resin.

In accordance with the present invention, it has been found that electrostatic generating tendencies of a solid polymer of an ethylenically unsaturated aliphatic hydrocarbon can be suppressed by incorporating a polyhydroxy polymer in the polymer of an ethylenically unsaturated aliphatic hydrocarbon. The polyhydroxy polymer when distributed substantially throughout the polymer of an ethylenically unsaturated aliphatic hydrocarbon has been found to give antistatic protection which is substantially permanent for the service life of the articles made from the polymer. It has also been found that the polyhydroxy polymer does not sweat out or extrude to the surface of the articles made from the polymer and is not leached out by exposure to water.

The polyhydroxy polymer is effective when used in a small amount sufficient to suppress the accumulation of electrostatic charges. For most applications, amounts of about 0.05 to 5 wt. percent, preferably 0.1 to 2 wt. percent, based on the polymer of an ethylenically unsaturated aliphatic hydrocarbon are effective, although a greater amount can be employed. The optimum concentration of antistatic agent is dependent upon the degree of static elimination desired. No undesirable changes in physical properties of the polymer of an ethylenically unsaturated aliphatic hydrocarbon is noticed when the antistatic agent is employed within these preferred limits. The polymer of an ethylenically unsaturated aliphatic hydrocarbon can, after the incorporation of the antistatic agent, be formed in any desired shape such as sheet, film, filament, or into cast or molded articles.

The polymer of an ethylenically unsaturated aliphatic hydrocarbon into which the antistatic agent may be incorporated can also contain other materials such as dyes, pigments, fillers, plasticizers, lubricants, and the like without adversely affecting the effectiveness of the antistatic agent. These products can be incorporated into the polymer during any stage of its preparation or by compounding with the polymer before the forming operation.

The polymer of the ethylenically unsaturated aliphatic hydrocarbon is often made from monomers containing about two to eight, preferably about two to four, carbon atoms or mixtures thereof using conventional polymerization methods. The ethylenically unsaturated aliphatic hydrocarbon polymer frequently has a molecular weight in the range of about 12,000 to 300,000. Suitable polymers include polyethylene polyisobutylene, polyisoprene, etc.

The polyhydroxy polymer has an average of at least about 1.8 predominantly primary terminal allylic hydroxyl groups per molecule and is the addition polymer of a 1,3-diene of four to about 12 carbon atoms. The polyhydroxy polymer used in this invention is classed as a hydroxyl-terminated polymer of dienes. These would include hydrogenated or halogenated hydroxyl-terminated polybutadiene resins. The polyhydroxy polymer contains allylic hydroxyl groups, which usually are at the ends of the main, that is, the longest, hydrocarbon chain of these usually liquid diene polymers. The polyhydroxy polymer may, in general, have a viscosity at 30° C. of about 5–20,000 poises, preferably about 15 to 5000 poises. Often the polymer is obtained in a viscosity range of about 20 to 300 or 550 poises at 30° C. preferably, the polyhydroxy polymer has a viscosity of about 35 to 60 poises or about 190 to 260 poises. Thus, the polyhydroxy polymer is a liquid or a semisolid flowable, at least when subjected to moderate pressure, at ambient temperatures or a temperatures up to about 400° F. The allylic hydroxyl-terminated polymer used in the present invention will have molecular weights in the range of about 400 to about 25,000 as determined by cryoscopic, ebullioscopic or osmometric methods. The preferred hydroxyl-containing diene polymer will be in the molecular weight range of about 900 to 10,000. In contrast, conventional diene polymers such as GR-S rubber are extremely high in molecular weight, e.g., in the range of several hundred thousand.

The hydroxy-terminated diene polymer employed to make the novel compositions of this invention differ from conventional diene polymers known to be telechelic and/or hydroxy-containing in that the hydroxy components of the diene polymer used in this invention are in predominantly primary, terminal positions on the main hydrocarbon chain and allylic in configuration. Ordinarily, at least about 1.8 hydroxyl groups are present per molecule on the average, and advantageously, there are at least 2.1 to 3 or more hydroxyls per polymer molecule, preferably 2:1 to 2.8. As mentioned, the hydroxyl groups are predominantly allylic in structure, thereby being of a more reactive nature. By "allylic" configuration is meant the alpha-allylic grouping of allylic alcohol, that is, the terminal hydroxyls of the first polymer are attached to a carbon adjacent to a double-bond carbon. The polyhydroxy polymer preferably has the majority of its unsaturation in the main hydrocarbon chain.

The dienes which are employed to make the polymer are unsubstituted, 2-substituted or 2,3-disubstituted 1,3-dienes of four up to about 12 carbon atoms. The diene preferably has four to six carbon atoms and the substituents in the 2- and/or 3-position may be hydrogen, alkyl, generally lower alkyl, e.g. of one to four carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc.

The number and location of the hydroxyl groups and the molecular weight of the polymer can be a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100°–200° C., preferably about 100°–150° C.

The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having two to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 15 percent of the reaction mixture to assure a low molecular weight addition polymer product having more than two hydroxyl groups per molecule.

The usable polymers of butadiene will preferably conform to the following simplified chemical structure:

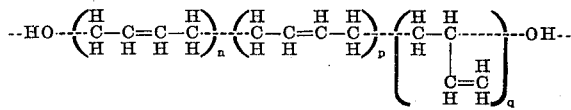

which n plus p is greater than q, that is, the in-chain unsaturation accounts for more than 50 percent of the unsaturation. One or more of the hydrogens appearing in the above formula may be replaced by hydroxyl in some of the molecules. This formula should not be understood as implying that the polymer is necessarily in blocks, but the cis-1,4-, trans-1,4- and vinyl (1,2) unsaturation are usually distributed throughout the polymer molecule. The letter n may represent a number sufficient to give a cis-1,4-unsaturation content of about 10–30 percent; p may be a number sufficient to give a trans-1, 4-unsaturation content to the polymer in the range of about 40–70 percent while q may be sufficient to give a pendant 1,2-vinyl unsaturation of about 10–35 percent. Often the polymer will contain largely trans-1,4- units, e.g., about 50–65 percent and about 15–25 percent cis-1,4-units, with about 15–25 percent 1,2-units. Branching may also occur in the above polymer, especially when prepared at higher temperatures.

Minor amounts of olefinically unsaturated monomers can be polymerized with the diene to give hydroxyl-containing polymer products useful in this invention and these may often be components which provide cross-linking sites. Usable monomers include alpha-mono olefinic materials of about two or three to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide etc., provide low-molecular weight hydroxy-terminated diene intermediate copolymers which has sites suitable for cross-linking. As can be seen, the usable olefinic monomers may be ethylenes, substituted with halogen, aromatic hydrocarbon, or even cyano or carboxyl-containing radicals in some instances. The choice and amount of mono-olefinic monomer employed will often be determined on the basis of properties desired in the final resin. Generally the amount of mono-olefinic monomer in the polymer will be about 0 to 45 wt. percent of the total addition polymer, preferably about 1 to 40 wt. percent or even about 10–40 wt. percent.

In addition to the homopolymers and copolymers comprised of single dienes and single mono-olefinic monomers, the present invention may also use polymers made from combinations of a plurality of dienes and mono-olefinic monomers. For example, mixtures of butadiene, isoprene and styrene can be polymerized to afford low molecular weight hydroxyl-containing interpolymers. Various combinations of dienes and mono-olefinic monomers may be copolymerized to produce hydroxyl-containing copolymers or interpolymers which may be used to form polymers. Also, the polymer materials used in this invention may be given improved oxidation and ozone resistance by hydrogenating the hydroxyl-containing diene polymers to their corresponding more-saturated derivatives. Usually, the hydroxyl-containing diene polymers used in the present invention will at most be only partially hydrogenated, so as to provide a material which is more stable due to diminished unsaturation.

The following examples are illustrative of various embodiments of this invention and include preferred embodiments.

EXAMPLE I

Four hydroxyl-terminated polybutadiene polymers and copolymers are described as being exemplary of those which may be used in the present invention.

Polybutadiene 45 is a polybutadiene homopolymer having a viscosity of 50 poises at 30° C., a hydroxyl content of 0.95 meq./g., a hydroxyl number of 53 mg. KOH/g., an average molecular weight of 2200–2500, about 2.1–2.2 per polymer molecule of terminal, allylic hydroxyl groups which are predominantly primary and an iodine number of 398. This polymer can be prepared by polymerizing 100 parts of butadiene in the presence of 70 parts of isopropanol and 10 parts of hydrogen peroxide in an aluminum clad autoclave at 118° C. for 2 hours.

Polybutadiene 15 is a homopolymer having a viscosity at 30° C. of 200 poises, a hydroxyl content of 0.80 meq./g., a hydroxyl number of 45 mg. KOH/g., an average molecular weight of 3000–3500, about 2.6 per polymer molecule of terminal, allylic hydroxyl groups which are predominantly primary and an iodine number of 395. This polymer can be made by polymerizing 100 parts of butadiene in the presence of 35 parts of isopropanol and 6 parts of hydrogen peroxide in an aluminum clad autoclave at 130° C. for 2½ hours. This polybutadiene can be used in place of polybutadiene 45 in example II.

Styrene copolymer 15 has a viscosity of 250 poises at 30° C. a hydroxyl content of 0.95 meq./g., a hydroxyl number of 53 mg. KOH/g., an average molecular weight of about 2200–2500, about 2.5 per polymer molecule of terminal, allylic hydroxyl groups which are predominantly primary, and an iodine number of 355. This copolymer can be prepared by copolymerizing 75 parts butadiene and 25 parts styrene in the presence of 70 parts isopropanol and 10 parts of 50 percent hydrogen peroxide in an aluminum clad autoclave at 120° C. for 2½ hours. This styrene copolymer can also be used in place of Polybutadiene 45 in example II.

Acrylonitrile copolymer 15 has a viscosity of 550 poises at 30° C., a hydroxyl content of 0.80 meq./g., a hydroxyl number of 45 mg. KOH/g., an average molecular weight of about 2500–3000, about 2.5 per polymer molecule of terminal, allylic hydroxyl groups which are predominantly primary, and an iodine number of 345. This copolymer can be prepared by copolymerizing 85 parts butadiene and 15 parts acrylonitrile in the presence of 70 parts isopropanol and 10 parts of 50 percent hydrogen peroxide in an aluminum clad autoclave at 118° C. for 1½ hours. This acrylonitrile copolymer can also be used in place of Polybutadiene 45 in example II.

EXAMPLE II

Commercial injection molding grade polyethylene having a molecular weight of about 25,000 and 0.5 wt. percent, based on the polyethylene, of Polybutadiene 45 were compounded on a rubber mill. The working temperatures were usually equal to, or somewhat higher than, that generally used for polyethylene. The control samples of polyethylene were milled and mixed at the same temperature, for the same length of time, and with the same degree of working as the polyethylene samples containing the Polybutadiene 45. The physical properties such as tensile, impact, hardness, etc. of the polyethylene samples containing the Polybutadiene 45 were essentially the same as those of the control samples of polyethylene and there was no alteration in physical properties by compounding the Polybutadiene 45 with the polyethylene.

The polyethylene compounds were injection molded into samples of disk form with a diameter of 100 mm. and a thickness of 4 mm. The samples were dried at 40° C. under vacuum over phosphorous pentoxide to constant weight. They were then transferred to a room at 25° C. and 50 percent relative humidity and conditioned up to constant weight, that is, until they reached equilibrium with the relative humidity which required approximately 2 weeks.

In order to insure greater reproducibility, the specimens were previously discharged with a humid rug and then selected specimens were rubbed with a rotating disk covered by a wool rug. The rug was discharged before every test. The specimen was held against the rug by a spring with constant rubbing pressure. Rubbing lasted 10 seconds and the rubbing disc rotated at a speed of about 1,450 r.p.m. Surface potential readings were taken 45 seconds after rubbing. The surface potential readings were performed with a Baldwin Dunlap Statigun Mark IV. The Statigun is manufactured by the Baldwin Instrument Co., Dartford, England and is a comparatively small, self-contained instrument which can be conveniently held in the hand. In principle, it consists of an electrometer valve energized by a standard dry battery. When switched on, the valve conducts and the anode current is measured by a small meter which is situated at the rear of the instrument. The grid of the valve is connected to a pickup electrode placed at the end of the barrel. When introduced into an electrostatic field, a charge is induced into the pickup electrode causing an equal and opposite charge to be applied to the grid of the valve and thus to change the anode current and show as a deflection on the meter. Deflection of the meter is proportional to the magnitude of the electrostatic field and, as the instrument is calibrated in V./cm., comparison is a simple matter. In using the instrument, it is possible to determine the exact position where static is being generated and to observe the effects of antistatic measures. By taking a number of readings it is also possible to correlate the generation of the static with such variables as humidity, material and speed of operation. The instrument indicates the polarity of the charge and its range covers variations in voltage of static charges normally experienced in plastics materials and processes.

The antistatic properties of the various samples tested are contained in table I below.

TABLE I

Static Charge Measurements

| | |
|---|---|
| Polyethylene, Control-not rubbed | −23 V./cm. |
| Polyethylene—0.5 wt. percent Polybutadiene 45-not rubbed | −18 V./cm. |
| Polyethylene, Control-rubbed | −135 V./cm. |
| Polyethylene—0.5 wt. percent Polybutadiene 45-rubbed | −36 V./cm. |

As shown in table I above, the polyethylene sample containing Polybutadiene 45 showed excellent antistatic properties while the polyethylene sample containing no antistatic agent showed very poor antistatic properties. Even when the polyethylene samples were not rubbed to generate electrostatic charge, the polyethylene sample containing the Polybutadiene 45 showed superior antistatic properties.

It is claimed:

1. A solid composition of a polymer of an ethylenically unsaturated aliphatic hydrocarbon wherein electrostatic charges are suppressed comprising (I) a normally solid, synthetic polymer of an ethylenically unsaturated aliphatic hydrocarbon having therein (II) a small amount, sufficient to suppress the accumulation of electrostatic charges, of a polyhydroxy polymer of a 1,3-diene of 4 to about 12 carbon atoms, said polyhydroxy polymer having an average of at least about 1.8 predominantly primary, terminal, allylic hydroxyl groups per molecule and having a viscosity at 30° C. of about 5 to 20,000 poises and a number average molecular weight of about 400 to 25,000.

2. The composition of claim 1 wherein the polyhydroxy polymer is present in an amount of about 0.1 to 2 wt. percent based on the synthetic of the ethylenically unsaturated aliphatic hydrocarbon.

3. The composition of claim 1 wherein the synthetic polymer of the ethylenically unsaturated aliphatic hydrocarbon is polyethylene and the polyhydroxy polymer is of a 1,3-diene of four to six carbon atoms, said polyhydroxy polymer having a viscosity at 30° C. of about 20 to 300 poises and a number average molecular weight of about 900 to 10,000.

4. The composition of claim 1 wherein the synthetic polymer of the ethylenically unsaturated aliphatic hydrocarbon is polyethylene and the polyhydroxy polymer is of a 1,3-butadiene, said polyhydroxy polymer having 2.1 to 2.8 predominantly primary, terminal, allylic hydroxyl groups per molecule, a viscosity at 30° C. of about 20 to 300 poises, a number average molecular weight of about 900 to 10,000, and the major portion of its unsaturation in the main hydrocarbon chain.

5. The composition of claim 4 wherein the synthetic polyhydroxy polymer is present in the amount of about 0.1 to 2 wt. percent based on the polymer of the ethylenically unsaturated aliphatic hydrocarbon.

* * * * *